(12) United States Patent
Sieb et al.

(10) Patent No.: US 10,322,607 B2
(45) Date of Patent: Jun. 18, 2019

(54) COMPACT MECHANIC'S CREEPER

(71) Applicants: Erik Sieb, Quebec (CA); André Wagner, Quebec (CA)

(72) Inventors: Erik Sieb, Quebec (CA); André Wagner, Quebec (CA)

(*) Notice: Subject to any disclaimer, the term of this patent is extended or adjusted under 35 U.S.C. 154(b) by 0 days.

(21) Appl. No.: 15/110,467

(22) PCT Filed: Jan. 9, 2015

(86) PCT No.: PCT/CA2015/050012
§ 371 (c)(1),
(2) Date: Jul. 8, 2016

(87) PCT Pub. No.: WO2015/103706
PCT Pub. Date: Jul. 16, 2015

(65) Prior Publication Data
US 2016/0332483 A1 Nov. 17, 2016

Related U.S. Application Data

(60) Provisional application No. 61/925,411, filed on Jan. 9, 2014.

(51) Int. Cl.
*B25H 5/00* (2006.01)
*B60B 33/00* (2006.01)

(52) U.S. Cl.
CPC ........... *B60B 33/0052* (2013.01); *B25H 5/00* (2013.01)

(58) Field of Classification Search
CPC .............................. B60B 33/0052; B25H 5/00
USPC ....................................................... 280/32.6
See application file for complete search history.

(56) References Cited

U.S. PATENT DOCUMENTS

| | | | | |
|---|---|---|---|---|
| 3,361,437 A | * | 1/1968 | Loftis | B25H 5/00 188/5 |
| 3,818,542 A | * | 6/1974 | Jones | B60B 33/0052 16/18 CG |
| 4,795,180 A | * | 1/1989 | Polcyn | B25H 3/00 206/373 |

(Continued)

FOREIGN PATENT DOCUMENTS

| | | |
|---|---|---|
| CA | 2534153 A1 | 7/2006 |
| CA | 2508191 A1 | 10/2006 |

OTHER PUBLICATIONS

International Search Report of corresponding PCT application No. PCT/CA2015/050012.

*Primary Examiner* — James A Shriver, II
*Assistant Examiner* — Brian L Cassidy
(74) *Attorney, Agent, or Firm* — Hugh Mansfield

(57) ABSTRACT

A compact mechanic?s creeper comprising an elongate body comprising a back rest portion and a head rest portion, a pair of ground contacting wheels, one of each of the wheels on either side of the back rest portion, each of the wheels rotating about a respective fixed axis of rotation positioned substantially at a right angle to a length of the elongate body and a ground contacting swivel towards a top end of the elongate body. When a user lies supine on the creeper with his head on the head rest portion, an upper edge of the pair of wheels are positioned on either side and substantially at a level of the user?s hips. In a particular embodiment the respective fixed axes of rotation are at an angle to one another and meet at a point above a center of the back rest portion.

23 Claims, 11 Drawing Sheets

(56) References Cited

U.S. PATENT DOCUMENTS

| | | | | |
|---|---|---|---|---|
| 4,875,694 A * | 10/1989 | Hamrick | B25H 5/00 | |
| | | | 280/32.6 | |
| D330,619 S * | 10/1992 | Gilbert | D34/23 | |
| 5,213,350 A * | 5/1993 | Hermanson | B25H 5/00 | |
| | | | 280/32.6 | |
| D360,514 S | 7/1995 | Collingridge et al. | | |
| D398,124 S * | 9/1998 | Schultz | D34/23 | |
| 6,341,787 B1 * | 1/2002 | Mason | B62B 1/18 | |
| | | | 280/47.26 | |
| 6,345,828 B1 * | 2/2002 | Pool | B25H 5/00 | |
| | | | 280/32.6 | |
| 7,032,907 B1 | 4/2006 | Marsh | | |
| 7,114,742 B1 * | 10/2006 | Sterns | B25H 5/00 | |
| | | | 280/639 | |
| 7,182,351 B2 * | 2/2007 | Williams | A47D 13/04 | |
| | | | 280/32 | |
| 7,293,783 B2 * | 11/2007 | Whiteside | B25H 5/00 | |
| | | | 280/32.5 | |
| 7,481,498 B1 * | 1/2009 | Morris | B60B 3/001 | |
| | | | 152/324 | |
| 7,726,668 B2 * | 6/2010 | Sieb | B25H 5/00 | |
| | | | 280/32.6 | |
| 8,056,908 B2 | 11/2011 | Scott | | |
| 9,108,665 B2 * | 8/2015 | Amino | B62D 5/0418 | |
| 2003/0168824 A1 * | 9/2003 | Miles | B25H 5/00 | |
| | | | 280/32.6 | |
| 2004/0094915 A1 * | 5/2004 | Warren | A63C 17/0026 | |
| | | | 280/11.19 | |
| 2005/0161894 A1 * | 7/2005 | Lensing | B25H 5/00 | |
| | | | 280/32.6 | |
| 2006/0082084 A1 * | 4/2006 | Rush | B25H 5/00 | |
| | | | 280/32.6 | |
| 2006/0170170 A1 * | 8/2006 | Whiteside | B25H 5/00 | |
| | | | 280/32.6 | |
| 2006/0186619 A1 * | 8/2006 | Sieb | B25H 5/00 | |
| | | | 280/32.6 | |
| 2006/0237922 A1 * | 10/2006 | Forbis | B25H 5/00 | |
| | | | 280/32.6 | |
| 2007/0080510 A1 * | 4/2007 | Ji | B25H 5/00 | |
| | | | 280/32.6 | |
| 2007/0256868 A1 * | 11/2007 | Romig | A01D 34/008 | |
| | | | 180/6.5 | |
| 2008/0093810 A1 * | 4/2008 | Liu | B25H 5/00 | |
| | | | 280/32.6 | |
| 2009/0256325 A1 * | 10/2009 | Dickie | A63C 17/0066 | |
| | | | 280/87.042 | |
| 2010/0123293 A1 * | 5/2010 | Benjamin | B25H 5/00 | |
| | | | 280/32.6 | |
| 2011/0063821 A1 * | 3/2011 | Prosey | F21S 9/02 | |
| | | | 362/183 | |
| 2011/0227303 A1 * | 9/2011 | Gering | B25H 1/04 | |
| | | | 280/32.6 | |
| 2013/0175777 A1 * | 7/2013 | Bermal | A63C 17/012 | |
| | | | 280/87.042 | |
| 2013/0326844 A1 * | 12/2013 | Stoehr | B60B 27/001 | |
| | | | 16/46 | |
| 2014/0062054 A1 * | 3/2014 | Schaaper | B60B 1/02 | |
| | | | 280/250.1 | |
| 2015/0027801 A1 * | 1/2015 | Amino | B62D 5/0418 | |
| | | | 180/446 | |
| 2015/0061239 A1 * | 3/2015 | Riddiford | B62B 1/208 | |
| | | | 280/5.28 | |
| 2015/0283853 A1 * | 10/2015 | Wang | A63C 17/223 | |
| | | | 301/95.11 | |

\* cited by examiner

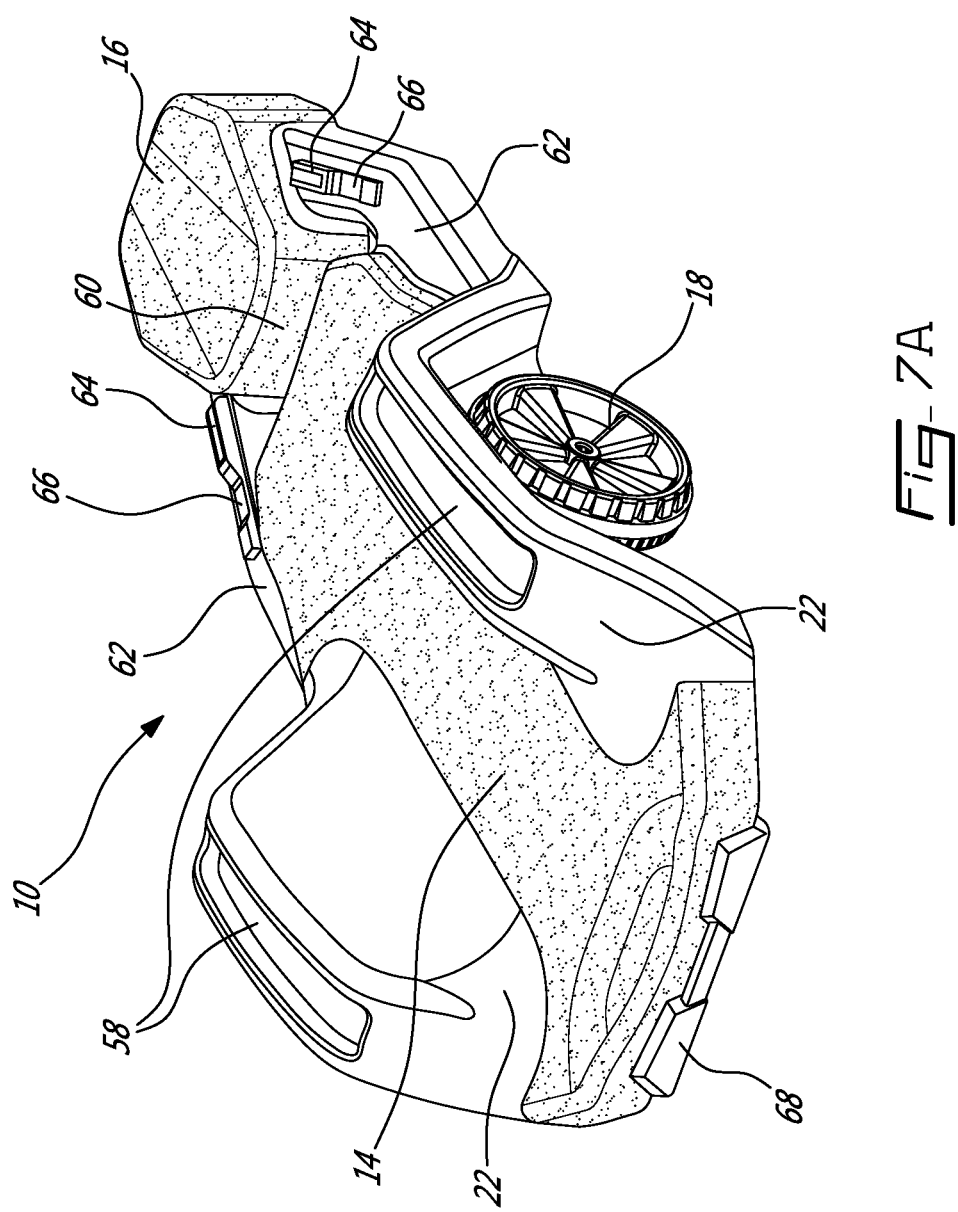

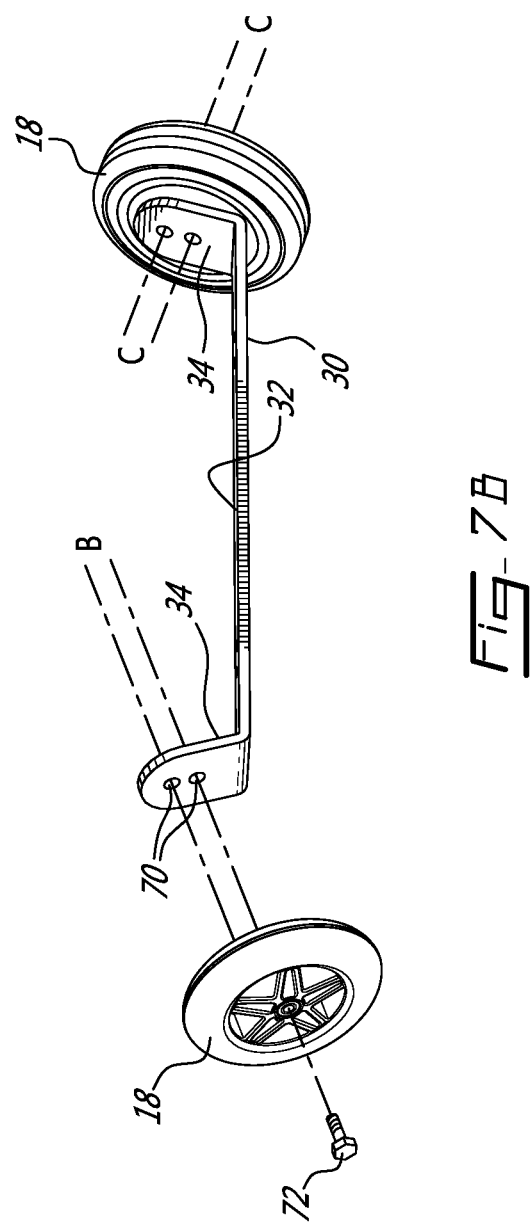

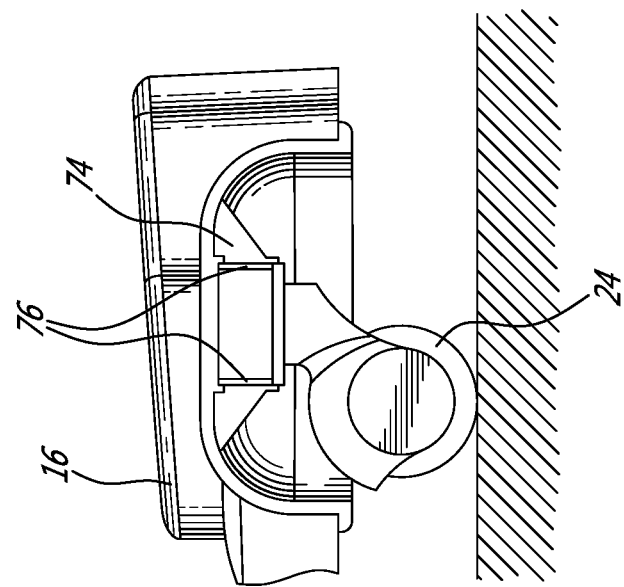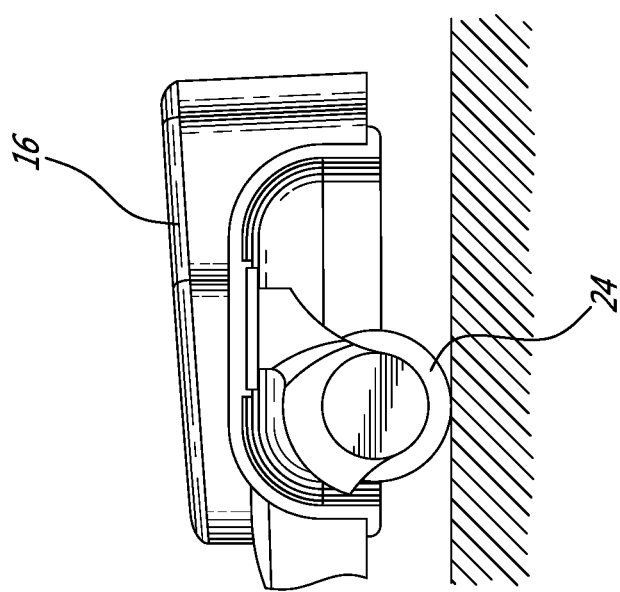
Fig-7C

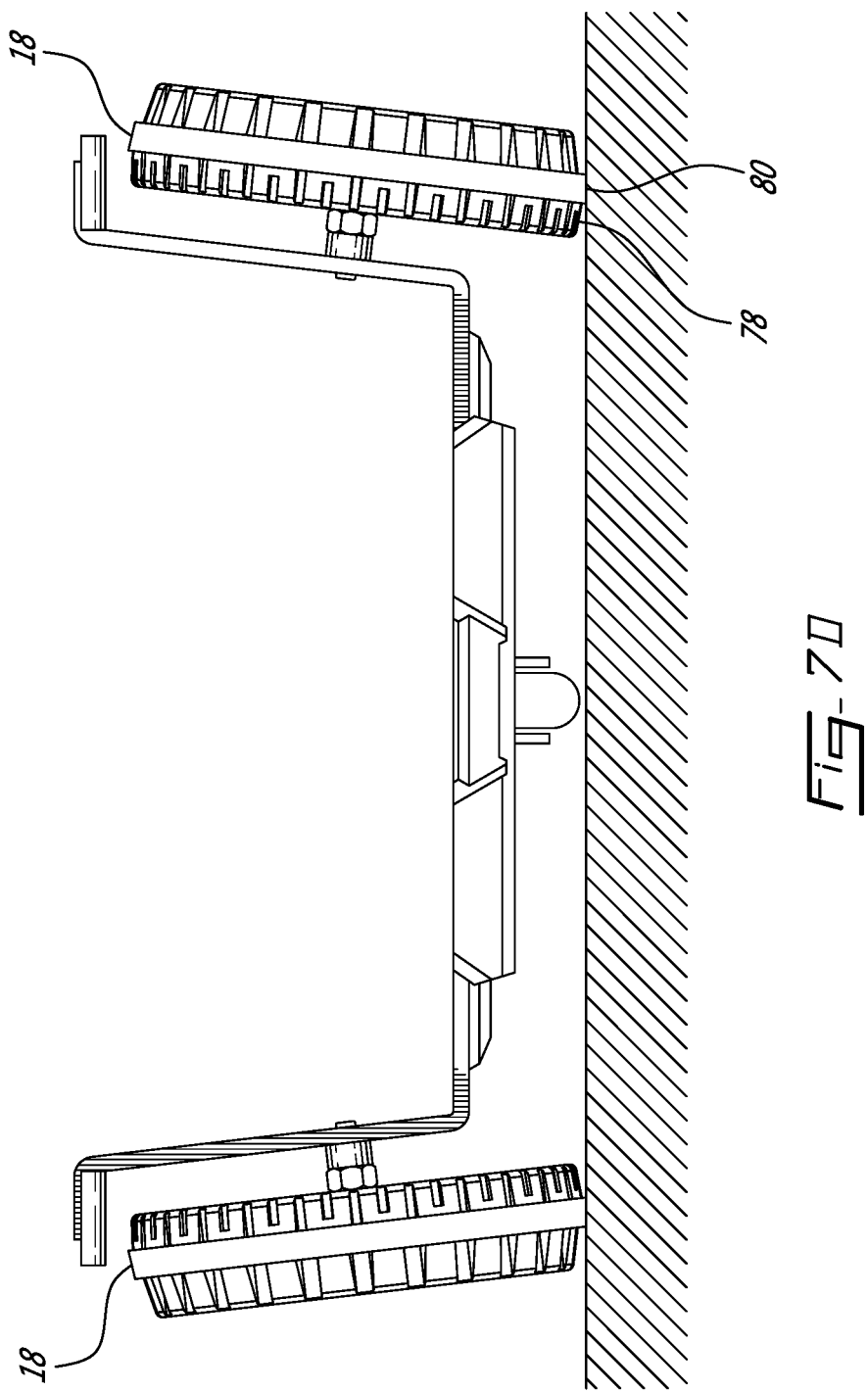

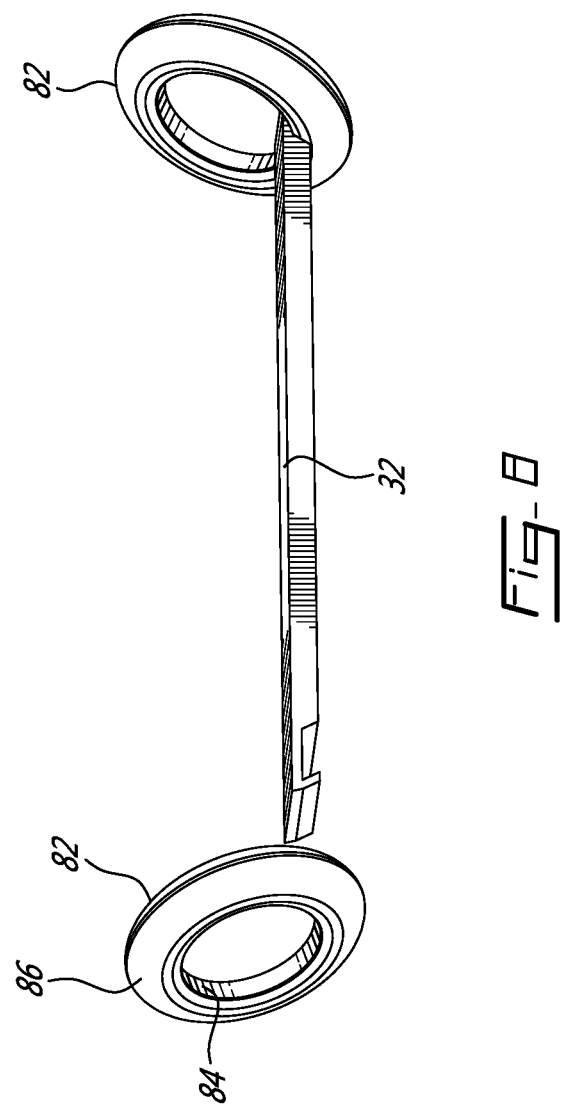

COMPACT MECHANIC'S CREEPER

CROSS-REFERENCE TO RELATED APPLICATIONS

This application is a National Entry Application of PCT application no PCT/CA2015/050012 filed on Jan. 9, 2015, which itself claims benefit of U.S. provisional application Ser. No. 61/925,411, filed on Jan. 9, 2014. All documents above are incorporated herein in their entirety by reference.

FIELD OF THE INVENTION

The present invention relates to creepers and, more specifically, to creepers for use in manoeuvring under an object such as a motor vehicle.

BACKGROUND OF THE INVENTION

Creepers for use in working or manoeuvring beneath automobiles, trucks and other such motor vehicles are well known and have been used by the novice and professional automobile mechanic for years. Existing creepers suffer many drawbacks. For example, conventional creepers have either small swivel wheels (small casters) attached to the creeper body, beneath the occupant, or have larger swivel wheels (large casters) attached away from the creeper body to enable the casters to swivel without being hampered by the edge of the creeper and/or the occupant's body. To maintain stability, the casters are typically positioned towards the exterior edge of the creeper body (and typically under the creeper when using small swivel casters or about the periphery of the creeper body if large swivel casters) thus providing for both translational and rotational movement of the creeper. Small casters have the disadvantage of being easily obstructed by cracks in the floor or debris or the like. Large casters on the other hand have the disadvantage of requiring a greater "footprint" than the creeper occupant's body. Additionally, large casters typically raise the creeper above the ground making the creeper unstable and more difficult to manoeuver and also reduce the clearance between the occupant and the object under which the occupant is working.

SUMMARY OF THE INVENTION

In order to address the above and other drawbacks there is provided a compact mechanic's creeper comprising an elongate body comprising a back rest portion and a head rest portion, a pair of ground contacting wheels, one of each of the wheels on either side of the back rest portion, each of the wheels rotating about a respective fixed axis of rotation positioned substantially at a right angle to a length of the elongate body and a ground contacting swivel towards a top end of the elongate body. When a user lies supine on the creeper with his head on the head rest portion, an upper edge of the pair of wheels are positioned on either side and substantially at a level of the user's hips. In a particular embodiment the respective fixed axes of rotation are at an angle to one another and meet at a point above a centre of the back rest portion.

There is also provided a creeper assembly for protecting a user in a supine position when maneuvering on a ground surface under a supported object having a mass of at least one (1) ton. The assembly comprises a mechanic's creeper comprising an elongate body comprising a back rest portion and a head rest portion and a first plurality of wheels, a support for removeably receiving the mechanic's creeper, a safety structure coupled to the support, the safety structure comprising at least one upwardly projecting rigid element capable of supporting the mass of the object and defining a protective space above the back rest portion and the head rest portion.

BRIEF DESCRIPTION OF THE DRAWINGS

Reference will now be made to the accompanying drawings, showing by way of illustration, illustrative embodiments of the present invention, and in which:

FIG. 7A provides a perspective view of a compact mechanic's creeper in accordance with an alternative illustrative embodiment of the present invention;

FIG. 7B provides a partially exploded detail view of an adjustable wheel assembly in accordance with an alternative embodiment of the present invention;

FIG. 7C provides a detailed partially cutaway side plan view of a swivelling wheel detailing the effect of adding a spacer and in accordance with an alternative embodiment of the present invention;

FIG. 7D provides a detailed rear plan view of a wheel assembly and in accordance with an alternative embodiment of the present invention; and FIG. 8 provides a partially exploded detail view of a centreless wheel assembly in accordance with a second alternative embodiment of the present invention.

DESCRIPTION OF THE ILLUSTRATIVE EMBODIMENTS

Figure 1:
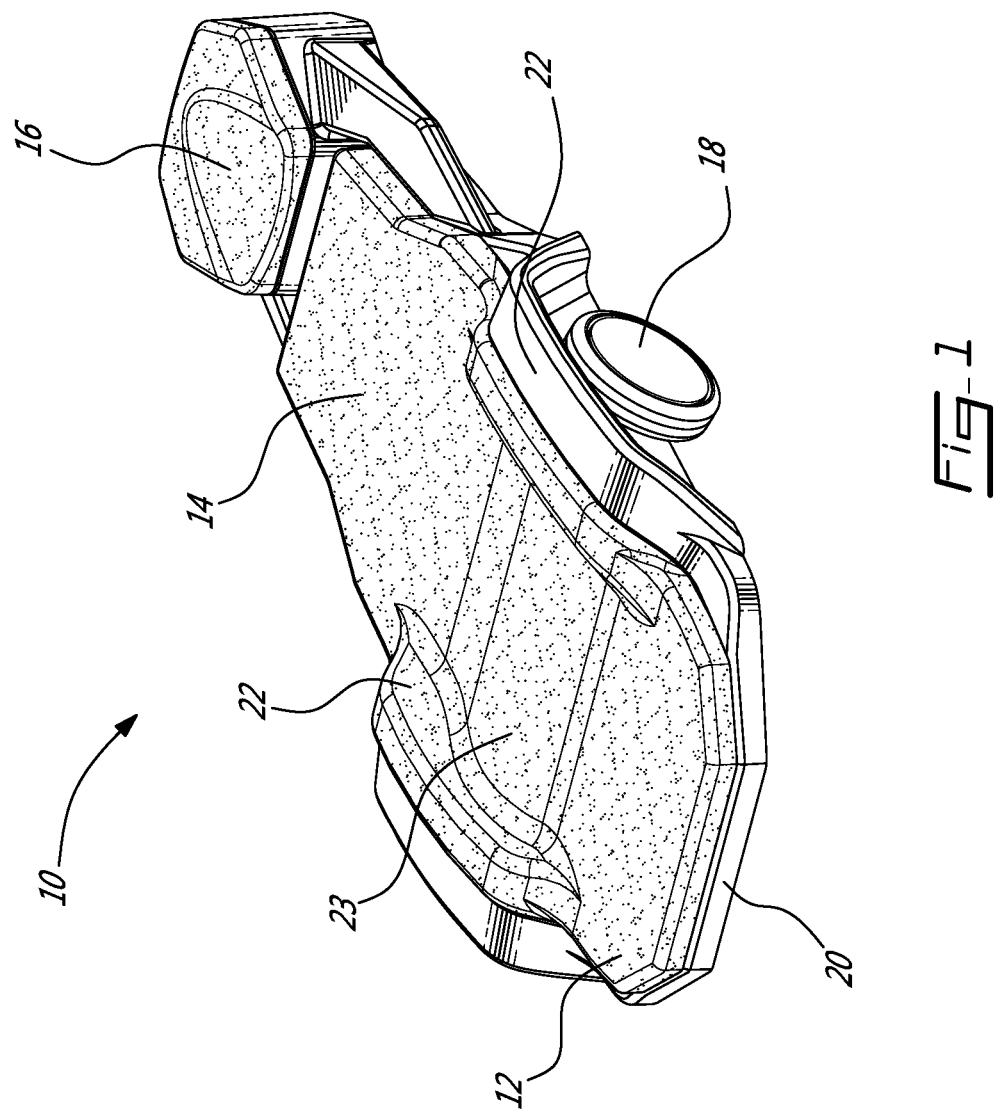
FIG. 1 is an isometric view of a compact mechanic's creeper in accordance with an illustrative embodiment of the present invention.

Referring now to FIG. 1, a compact mechanic's creeper, generally referred to using the numeral 10, and in accordance with an illustrative embodiment of the present invention, will now be described. The creeper 10 is generally for use by a professional or novice mechanic, or any individual for that matter that seeks to obtain access, generally in a supine position, to the under body of a vehicle or other such heavy machinery (not shown) for maintenance, inspection, general reparation or any other such activity. The vehicle in question may be raised using a standard jack or jack stands, or any other such device that will allow the vehicle to be raised sufficiently to allow the individual to work underneath it.

Still referring to FIG. 1, the creeper 10 comprises an elongate plastic body 12, manufactured for example using blow moulded plastic or the like, onto which a comfortable foam back rest portion 14 and head rest portion 16 are adhered or otherwise included. A pair of relatively large angled wheels as in 18 is provided towards a bottom end 20 of the creeper 10. The body 12 further comprises a pair opposed raised wheel guards 22 arranged on either side of the user (not shown) coinciding with the wheels 18 to prevent inadvertent engagement of the wheels with the user during rotation. A raised lumbar supporting region 23 arranged transversely to the body 12 can be included in the back rest portion 14 to improve comfort Referring now to FIG. 2 in addition to FIG. 1, the creeper 10 further comprises a relatively small rotating wheel 24 (or a swivel) mounted on a swivelling platform 26 or the like and positioned towards the top end 28 of the body 12. Additionally, the angled wheels as in 18 are interconnected using a re-enforcing plate 30, for example fabricated from a strong resilient material such as steel or the like. Note that in a particular embodiment, the rotating wheel 24 and swivelling platform 26 can be replaced by a rotating ball (not shown). When in use this first plurality of wheels comprised of the angled wheels as in 18 and the rotating 24 wheel hold the lower surface of the back rest portion 14 and head rest portion 16 away from the ground, illustratively by about one (1) inch (or 25 millimeters).

Figure 3:
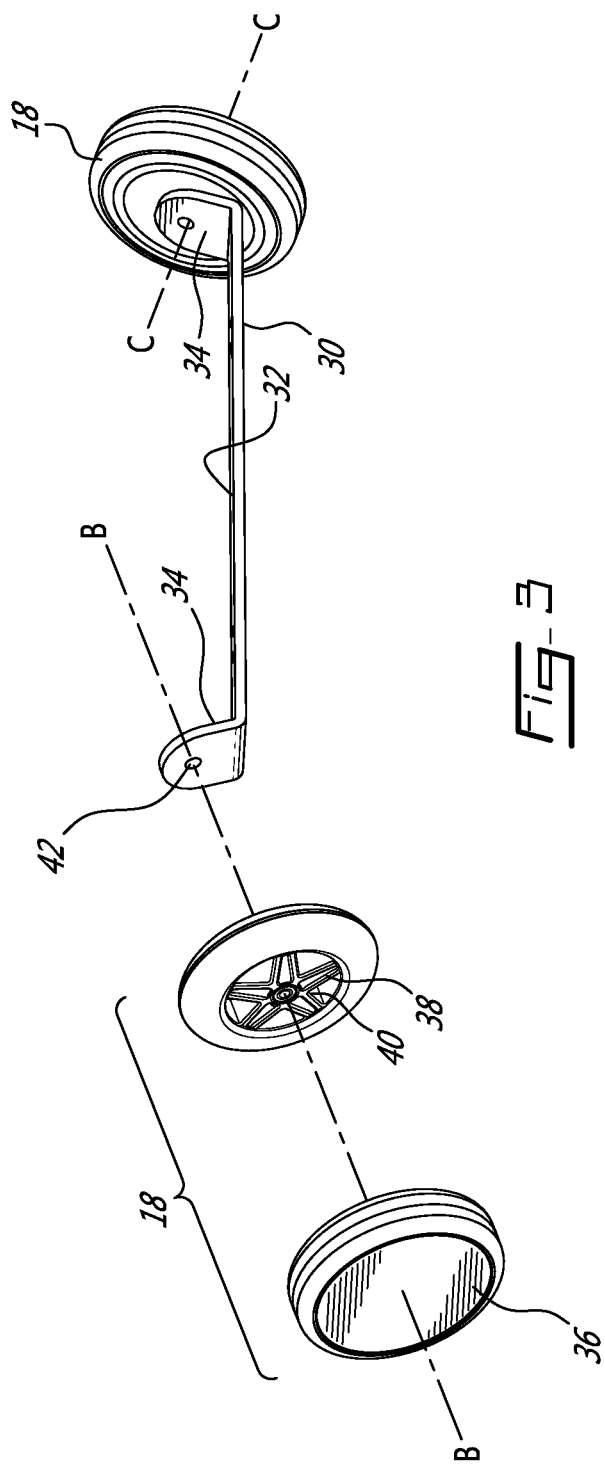
FIG. 3 is a left bottom isometric view of a wheel assembly of a compact mechanic's creeper and in accordance with an illustrative embodiment of the present invention.

Referring now to FIG. 3, the re-enforcing plate 30 comprises an elongate member 32 interconnecting two wheel receiving wings as in 34. The angled wheels 18 each comprise an outer tread and hubcap assembly 36 which is arranged on a hub 38. A rolling bearing 40, such as a sealed ball or roller bearing or the like, is press fit into the hub 38 and is in turn secured to the re-enforcing plate 30, for example using a bolt of the like (not shown) which engages a threaded bore 42 formed in a respective one of the wings 34. Each wheel as in 18 is therefore free to rotate about its respective axis B-B, C-C and independent from one another. When assembled, the axes of the wheels 18 are raised somewhat versus existing creeper designs and such that the back rest portion 14 cradles the user when in use. This lowers the user's center of gravity somewhat versus existing creeper designs, improving stability.

Referring back to FIG. 2 in addition to FIG. 3, use of a combination of three wheels comprising the two larger fixed wheels as in 18 and the smaller rotating wheel 24, which is similar to a tripod, provides for a stable and continuous contact with the ground by all wheels especially on uneven surfaces. Additionally, provision of the fixed wheels as in 18 along the sides of the creeper 10 and their attachment at a point above a lower surface of the elongate body 12 allows for the use of larger diameter wheels, thereby improving stability and ground contact. Use of larger wheels also improves support when using the creeper 10 on softer surfaces. Although the large fixed wheels of the present invention are illustratively of between about 5 and 8 inches, in a particular embodiment larger wheels of up to 16 inches in diameter could also be used.

Figure 2:
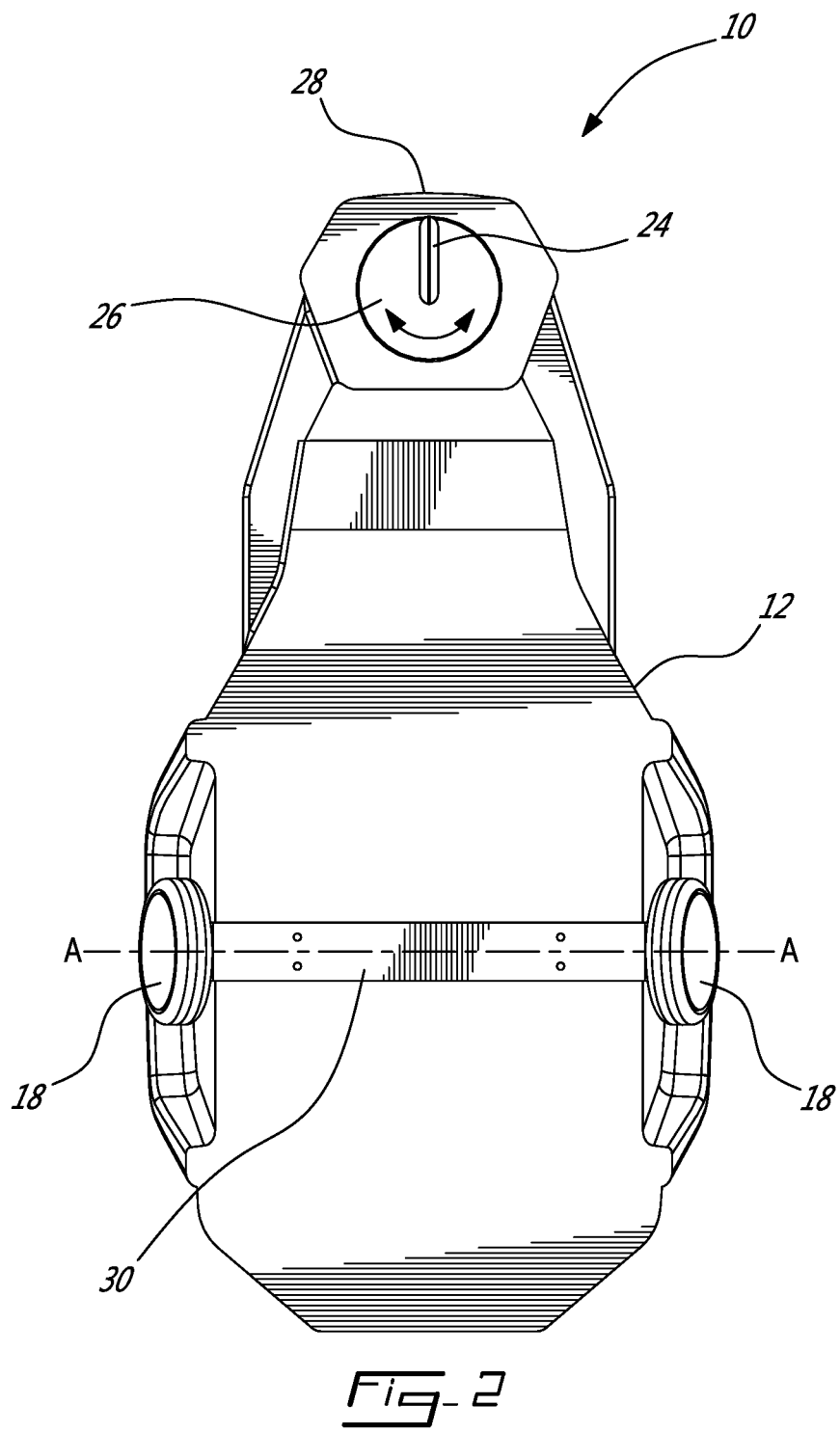
FIG. 2 is a bottom plan view of a compact mechanic's creeper in accordance with an illustrative embodiment of the present invention.

Still referring to FIG. 2 in addition to FIG. 3, provision of the larger wheels as in 18 at approximately the height of the user's hips and the small swivelling wheel 24 adjacent the user's head distributes about 90% of the user's weight to the larger wheels as in 18 and about 10% of the user's weight to the small swivelling wheel 24. This unexpectedly improves agility of the creeper 10, allowing the user, for example, to easily swing or pivot about a point as compared to existing prior art designs. As such, by simply swinging his hips with his feet on the ground, and given that the fixed wheels are located at approximately the mid-point of the user's weight, a "wiper motion" of the upper portion of the user's body is provoked. Using this motion, the user can easily scan and observe a wider area under a vehicle without requiring the user to use his hands on the ground or an underside of the object, which in the case of a vehicle is often dirty, greasy and/or hot. This frees both hands of the user such that he can hold tools or parts or the like while pivoting. Additionally, safety is improved as it is typically unnecessary for the user to use his hands on the underside of the object to impart a lateral movement, which can destabilise an object mounted on supports, for example.

Figure 4:
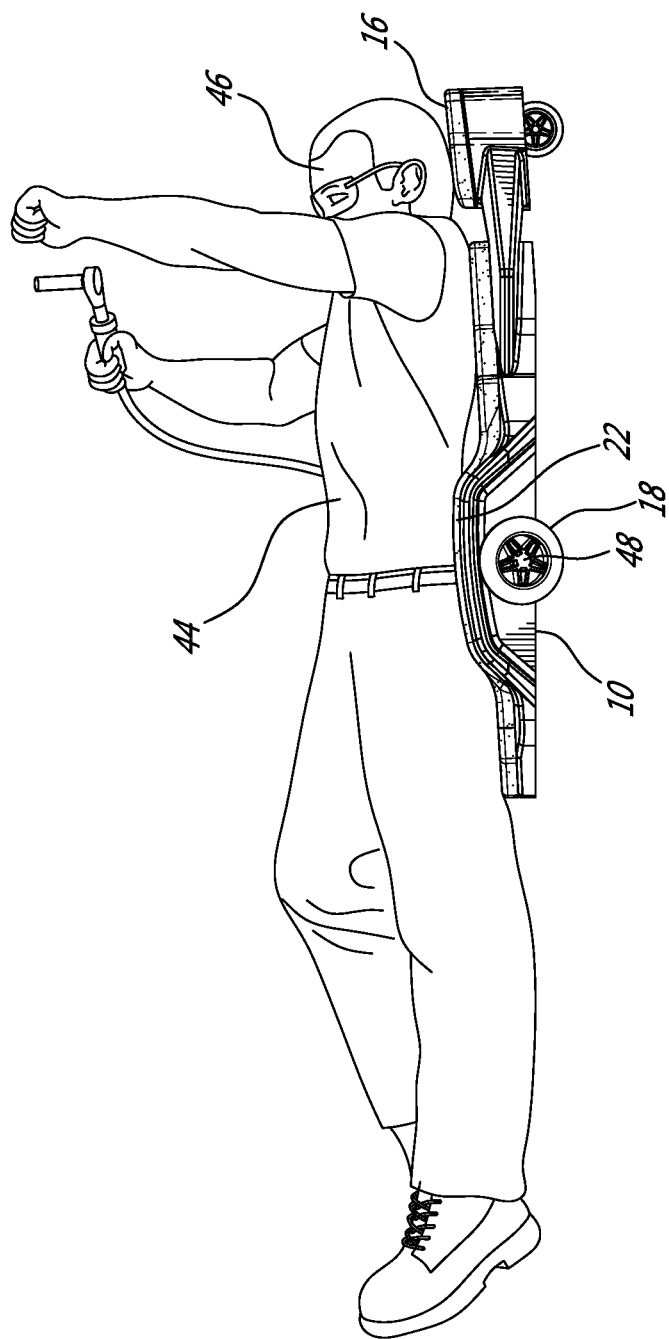
FIG. 4 is a side view of a compact mechanic's creeper with a user thereupon and in accordance with an illustrative embodiment of the present invention.

Referring now to FIG. 4 in addition to FIG. 2, the body 12 of the creeper 10 is dimensioned such that when a typical user 44 rests in a supine position on the creeper 10 with his head 46 resting on the head rest 16, the user's hips are positioned immediately above or flush with an axis A-A between the centers 48 of the wheels 18. Additionally, the user's hips fit snugly between the opposed raised wheel guards 22 comfortably cradling the user there between. This combination allows the user 44 to easily manoeuver the creeper 10 using his legs.

Figure 5:
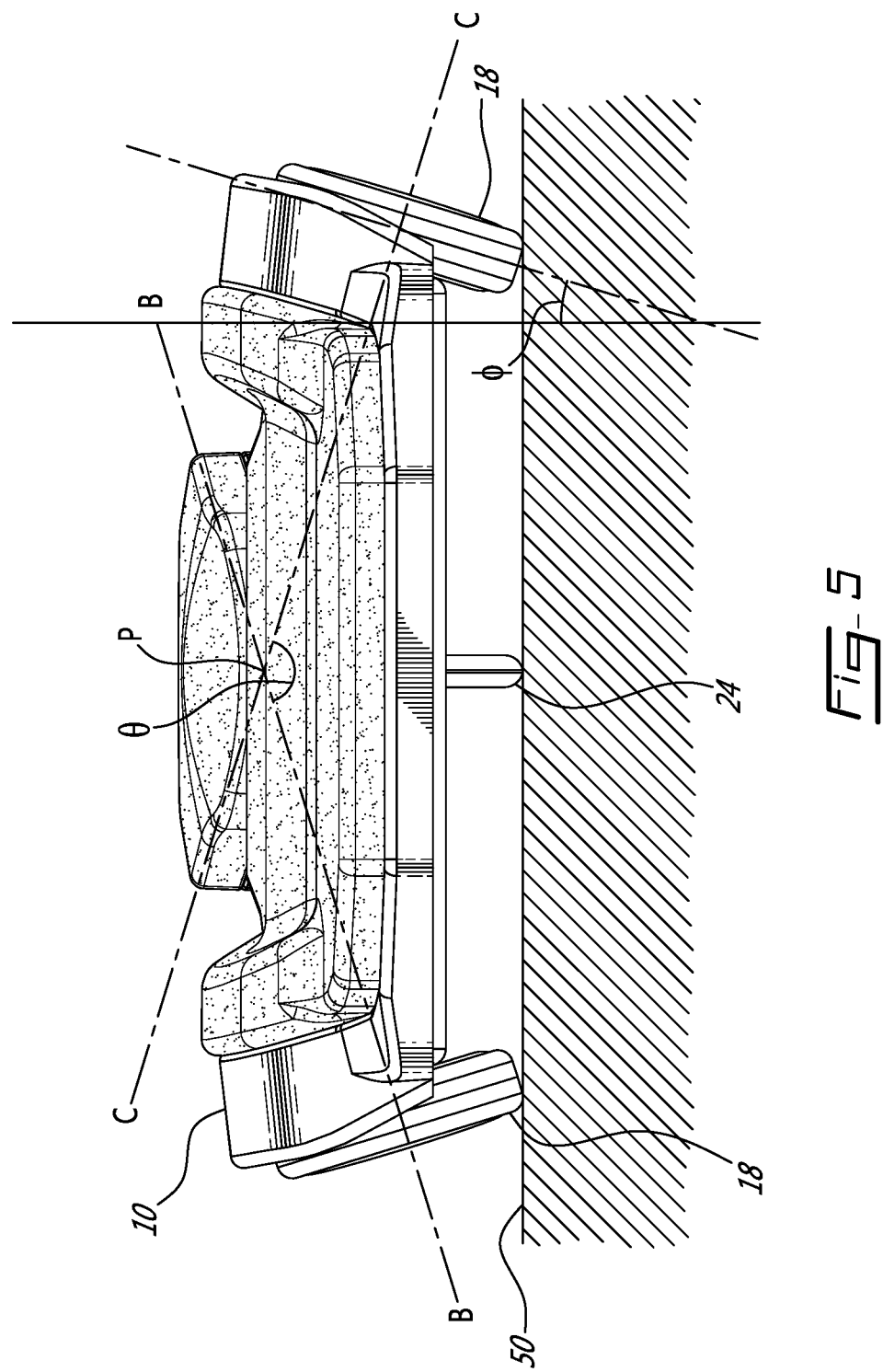
FIG. 5 is an end plan view of a compact mechanic's creeper in accordance with an illustrative embodiment of the present invention.

Referring now to FIG. 5, as discussed above the wheels 18 may be arranged at an angle $\varphi$ (between about 5 and 30 degrees, preferably about 8 degrees) to a line normal to a surface 50 upon which the creeper 10 is resting. It will now be apparent to a person of ordinary skill in the art that the respective axes of rotation B-B, C-C are both at right angles to a length of the elongate body 12 and at an angle $\theta$ between about 120 degrees and 170 degrees to one another at a point P where they meet above the centre of the back rest portion 14. Securing the wheels 18 at such an angle in combination with the swivelling wheel 24 or ball (not shown) as well as the positioning of the user (not shown) improves the maneuverability of the creeper 10 when working under a vehicle or the like.

Figure 6B:
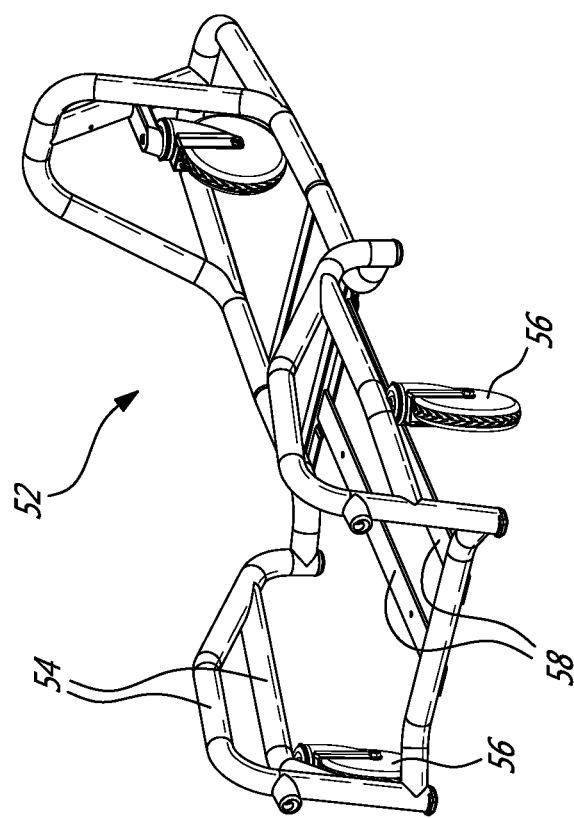
FIGS. 6A and 6B provide respectively isometric views of a protective superstructure and a protective superstructure combined with a compact creeper in accordance with an illustrative embodiment of the present invention.
Figure 6A:
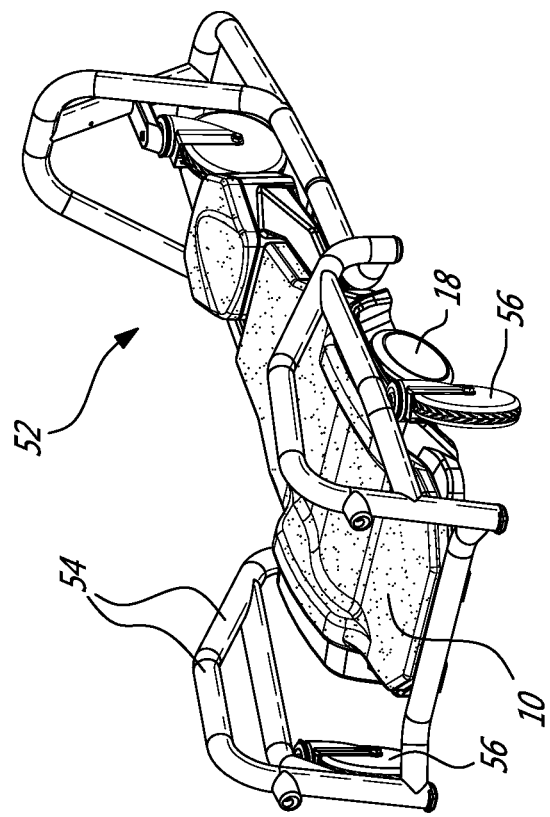

Referring now to FIGS. 6A and 6B, in a particular embodiment the creeper 10 can be removeably combined with a protective superstructure 52. The superstructure 52 comprises a series of re-enforced tubes 54 manufactured from a material capable of withstanding great weight, such as tubular steel or the like, which are arranged such that when combined with the creeper 10, they provide a protected space above the creeper 10 and are able to support the weight of the vehicle or other object under which the creeper is being manoeuvered, typically between 1 to 10 tons. As such, in the event of inadvertent movement of the object, for example when a jack supporting the object fails or slips or the like, the superstructure 52 engages the ground and provides the user some protection. Additionally, the superstructure 52 comprises relatively large wheels as in 56. The creeper 10 illustratively rests on a plurality of cross braces 58 which raise the wheels 18, 24 of the creeper 10 above the surface on which the superstructure 52 rests. An exemplary embodiment of such a superstructure 52 is discussed in U.S. Pat. No. 7,726,668 by Sieb et al. which is incorporated herein by reference in its entirety.

Referring now to FIG. 7A, in an alternative embodiment, the creeper 10 is further outfitted with tool trays as in 58 which are moulded in the wheel guards 22. Additionally, the headrest portion 16 is separated from the body portion 14 by a gap 60. The head rest portion 16 is connected to the body portion 14 by a pair of elongate members as in 62 which are arranged somewhat lower than the height of the head rest portion 16 and the body portion 14 in order to provide additional clearance for a user's shoulders and arms during use. This allows the user, for example, to better manoeuver the creeper 10 using his hands. LED lights as in 64 are integrated into one or both of the elongate members as in 62 including switches as in 66 and such that the user can selectively illuminate an object (not shown) under which the creeper 10 is being manoeuvered. The creeper 10 additionally comprises a bumper stand/skid plate 68 for reducing wear on the body portion 14 during use and storage.

Referring now to FIG. 7B, in the alternative embodiment of a wheel assembly according to the present invention, the two wheel receiving wings as in 34 are extended and one or more additional threaded bores as in 70 provided therein. In this manner, the height of the creeper vis-a-vis the ground can be adjusted by securing the wheel 18 using a bolt 72 to a selected one of the threaded bores as in 42, for example to provide increased ground clearance in the case of debris or unevenness or the like or less ground clearance on smooth services.

Referring to FIG. 7C in addition to FIG. 7B, similarly a spacer or riser 74 or similar mechanism can be provided to provide a complementary increase or decrease in height of the small rotating wheel 24 vis-a-vis the ground. The spacer 74 and wheel can be secured to the underside of the head rest portion 16 using bolts as in 76 or the like. Illustratively, in a first position the creeper 10 is provided with a ground clearance of about 1 inch which may be raised to about 2 inches through selection of the appropriate threaded bore as in 42 and provision of an appropriately sized spacer 70.

Referring now to FIG. 7D in addition to FIG. 7A, each of the wheels as in 18 comprises an angled tread profile 78 which is intersected by a raised smooth flat bead 80. The smooth bead 80 provides for reduced friction on smooth services such as a conventional garage floor, thereby improving agility and significantly reducing noise during movement. On unstructured or softer surfaces the angled tread profile 78 is engaged to provide additional support to prevent sinking and the like. The angle of the tread profile 78 and the smooth bead 80 is selected to match substantially that of the axis of rotation of the wheels 18 and such that a ground contacting portion of the tread profile 78 and a ground contacting portion of the smooth bead 80 lie substantially flat, or in parallel to the ground, when in contact with the ground.

Referring now to FIG. 8, in a second alternative embodiment of the creeper 10, each of the wheels as in 18 is replaced by a centerless wheel 82. The elongate member 32 is substantially flat and straight. Each of the centerless wheels as in 82 comprises a large centreless stationary hub 84 which is secured to the elongate member 32 using bolts or the like (not shown). The wheel/tire 86 is able to freely rotate about the centreless hub 84 on a bearing surface or the like (also not shown). Use of a centreless wheel as in 82 allows for a lower ground clearance while providing a point of attachment which is substantially flush with the underside of the creeper 10.

While this invention has been described with reference to the illustrative embodiments, this description is not intended to be construed to a limiting sense. Various modifications or combinations of the illustrative embodiments, as well as other embodiments of the invention, will be apparent to persons skilled in the art upon reference to the description. It is therefore intended that the described invention encompass any such modifications or embodiments.

What is claimed is:

1. A compact mechanic's creeper for use on a surface, comprising:
    an elongate body comprising a head end and a foot end, a head rest portion positioned towards said head end and a back rest portion having an underside arranged along a body axis between said head rest portion and said foot end wherein said head rest portion is raised relative to said back rest portion;
    a pair of ground contacting wheels, said wheels arranged opposite one another on either side of said back rest portion and positioned such that in use a distance between said underside and the surface is less than a diameter of said wheels, each of said wheels rotating about a respective fixed wheel axis of rotation positioned substantially at a right angle to a length of said elongate body and such that each of said wheels are held substantially aligned with said body axis, and wherein said pair of around contacting wheels comprise a positive camber;
    a ground contacting swivel positioned substantially in line with said body axis and towards a top end of said elongate body;
    wherein, in use, said elongate body is tiltable about a tilt axis intersecting a center of each of said ground contacting wheels between a first position wherein said ground contacting swivel touches the surface and a second position wherein said foot end touches the surface and said ground contacting swivel is raised above said surface.

2. The mechanic's creeper of claim 1, wherein said respective fixed axes of rotation are at an angle to one another and meet at a point above a centre of said back rest portion.

3. The mechanic's creeper of claim 1, wherein said elongate body is of moulded plastic.

4. The mechanic's creeper of claim 1, wherein said elongate body further comprises a pair of opposed raised wheel guards towards a bottom end thereof and on either side of said back rest portion and further wherein each of said wheels are adjacent a respective one of said wheel guards.

5. The mechanic's creeper of claim 1, wherein said pair of ground contacting wheels is secured to said back rest at a point above a lower surface thereof.

6. The mechanic's creeper of claim 1, wherein less than half of each of said pair of ground contacting wheels extends below a lower surface of said back rest portion.

7. The mechanic's creeper of claim 1, wherein an upper surface of said back rest portion and said head rest portion are upholstered with a soft foam covering.

8. The mechanic's creeper of claim 1, wherein an upper surface of said back rest portion comprises a transverse raised portion for supporting a lumbar region of the user.

9. The mechanic's creeper of claim 1, wherein said swivel is a swivelling wheel.

10. The mechanic's creeper of claim 1, wherein said swivel is positioned adjacent said head rest portion.

11. The mechanic's creeper of claim 2, wherein said angle is between 170 degrees and 120 degrees.

12. The mechanic's creeper of claim 11, wherein said angle is between 170 degrees and 150 degrees.

13. The mechanic's creeper of claim 11, wherein said angle is 164 degrees.

14. The mechanic's creeper of claim 1, wherein said back rest portion is attached to said head rest portion by a pair of elongate members, said back rest portion, said head rest portion and said pair of elongate members defining a gap.

15. The mechanic's creeper of claim 14, wherein an upper surface of each of said elongate members is below an upper surface of said back rest portion and an upper surface of said head rest portion.

16. The mechanic's creeper of claim 14, wherein at least one of said elongate members comprises a generally upward oriented light therein.

17. The mechanic's creeper of claim 1, wherein a position of each of said pair of ground contacting wheels and said ground contacting swivel are adjustable such that a ground contacting portion thereof may be selectively raised and lowered relative to a lower surface of said elongate body.

18. The mechanic's creeper of claim 1, wherein each of said ground contacting wheels comprises a tread and a raised bead bisecting said tread.

19. The mechanic's creeper of claim 18, wherein each of said ground contacting wheels is arranged at an angle $\varphi$ to the ground and further wherein said tread and said raised bead are angled generally at said angle $\varphi$ to said respective fixed wheel axis of rotation.

20. The mechanic's creeper of claim 1, wherein each of said ground contacting wheels is of a centerless design.

21. The mechanic's creeper of claim 1, wherein said ground contacting wheels are positioned closer to said foot end than said head end.

22. The mechanic's creeper of claim 21, wherein a first distance between a center of each of said ground contacting wheels and said head end is at least twice a second distance between said centers of each of said ground contacting wheels and said foot end.

23. The mechanic's creeper of claim 1, wherein said foot end comprises a skid plate and further wherein when in said second position said skid plate touches the surface.

\* \* \* \* \*